US005087906A

United States Patent [19]

Eaton et al.

[11] Patent Number: 5,087,906

[45] Date of Patent: Feb. 11, 1992

[54] SELECTIVE CALL RECEIVER HAVING A LIGHT CHANNEL FOR PROVIDING A VISUAL ALERT

[75] Inventors: Eric T. Eaton, Lake Worth; Rodney S. Whaley, Lantana, both of Fla.

[73] Assignee: Motorola, Inc., Schaumburg, Ill.

[21] Appl. No.: 489,128

[22] Filed: Mar. 5, 1990

[51] Int. Cl.[5] .......... H04Q 1/30; G08B 5/22

[52] U.S. Cl. .......... 340/311.1; 340/825.44; 340/815.31; 379/376; 379/396

[58] Field of Search .......... 340/311.1, 825.81, 825.82, 340/815.03, 825.44, 825.48, 815.31, 815.07, 815.11, 730, 753, 756-762, 781, 782; 455/600, 610; 379/136, 396, 376, 52, 57, 368

[56] References Cited

U.S. PATENT DOCUMENTS

| | | | |
|---|---|---|---|
| 3,509,561 | 4/1970 | Moore et al. | 340/215.31 |
| 3,553,666 | 1/1971 | Melone | 340/815.31 |
| 3,725,910 | 4/1973 | McNaney | 340/815.31 |
| 4,644,350 | 2/1987 | Ishii | 340/311.1 |
| 4,713,659 | 12/1987 | Oyagi et al. | 340/311.1 |
| 4,876,537 | 10/1989 | Oyamada | 340/311.1 |

*Primary Examiner*—Donnie L. Crosland
*Attorney, Agent, or Firm*—Vincent B. Ingrassia; Thomas G. Berry

[57] ABSTRACT

A selective call receiver includes a fiber optic channel located along the length of at least one side thereof for providing a visual alert of a received message.

14 Claims, 1 Drawing Sheet

SELECTIVE CALL RECEIVER HAVING A LIGHT CHANNEL FOR PROVIDING A VISUAL ALERT

FIELD OF THE INVENTION

This invention relates in general to the field of selective call receivers, and more particularly to a light channel providing a visual alert for a selective call receiver.

BACKGROUND OF THE INVENTION

Selective call radio receivers such as pagers are used to alert a user of a message. Such devices generally incorporate an audio or visual alert which may be detected by the user. The audio alert is undesirable in a number of situations where the presence or absence of environmental noise is a consideration, therefore, the visual alert may be more desirable. There are several conventional forms of visual alerts. Typically, an LED or lamp will illuminate a control button, the display area (e.g., liquid crystal display) or both. The user may then activate one or more control buttons to read and/or manipulate the received message. Viewing the visual alert and the respective control buttons has become increasingly more difficult as pagers have tended to become more miniaturized due to the advances in electronics. In contrast, the number of functions on today's pagers has tended to increase. This results in pagers being much smaller than they have been in the past while becoming increasingly complicated to operate due to the increased functions. The user may have difficulty using the selective call receiver having the smaller controls placed in closer proximity. In addition, it is not unusual for the user to be expected to activate a sequence of control buttons to achieve the desired function. Because of this, the user may become confused as to which button or sequence of buttons is necessary to produce the desired function. It would then be desirable to provide a larger visual alert, which is separate from the control buttons.

Thus, a need exists for alight channel providing a visual alert incorporated on a selective call receiver to maximize visibility.

SUMMARY OF THE INVENTION

Accordingly, it is an object of the present invention to provide an improved selective call receiver.

In carrying out the above and other objects of the invention in one form, there is provided a selective call receiver comprising a housing, a receiver disposed within the housing for receiving messages, a light source for providing light, and a light channel having a first end contiguous to the light source and the housing so that the light is emitted along the length of the light channel for providing an alert that a message has been received.

BRIEF DESCRIPTION OF THE DRAWING

The single FIGURE is a perspective view of the preferred embodiment of the present invention.

DETAILED DESCRIPTION OF THE INVENTION

Figure 1:
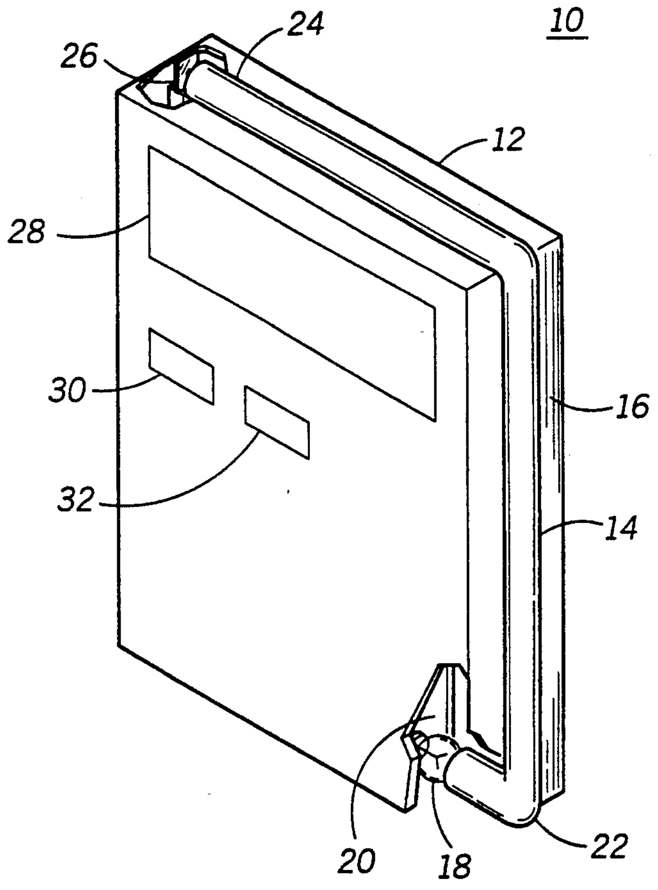

Referring to the FIG. 1, a selective call receiver 10 comprises a housing 12 and a light channel (e.g., fiber optic cable) 14 positioned along an outer surface 16. The light channel 16 may comprise a variety of sizes and lengths without deviating from the intent of the invention. The light channel 16 is illuminated at a first end 22 by a light source (e.g., LED or lamp) 18. The light source 18 is positioned on a printed circuit board 20 such that the light source is contiguous to the first end 22 of the light channel 14. The light source 18 travels through the light channel 14 at a predetermined wavelength to maximize diffusion of the light source 14.

In the preferred embodiment, the light channel 14 is a single mode fiber that comprises a germanium doped core and a silica cladding such as AT&T's 62.5 Micron Single Mode Fiber. Utilizing a red LED (i.e. light source) 18 transmits light having approximately a 700 nanometer (nm) wavelength. The single mode fiber optic cable 14 has a transmission of the red LED 18 is highly inefficient, which results in maximum diffusion of the light source 18. Maximizing the diffusion of the light source 18 results in a brighter visual alert of the fiber optic cable 14. Multimode or group mode cable is designed to transmit a wide range of wavelengths. Therefore, fewer losses result during transmission of the light source 18 and the fiber optic cable 14 will not be as bright as when a high level of losses result.

The light source 18 is transmitted to a second end 24 of the fiber optic cable 14. In the preferred embodiment, a reflector (e.g., mirror) 26 is contiguous to the second end of the channel 14 to reflect the light source back through the cable 14. The reflector may comprise an active (e.g., transistor or operational amplifier) or passive (e.g., capacitor, inductor, or resistor) matching component without deviating from the intent of the invention. The impedance of the cable 14 is calculated such that a totally reflective match of the light source's (18) wavelength will occur. This results in the diffused light being reflected back toward the light source 18, effectively doubling the light in the fiber optic cable 14. More light is then available to be diffused in the cable 14 and the light emitted along the cable 14 is maximized.

The housing 12 also comprises a display 28 and controls 30 and 32. As a message is received, the light source 18 is activated, thereby sending light through the fiber optic cable 14. The light is then reflected back to the first and (i.e. light source 18) of the fiber optic cable 14 by a totally reflective match, maximizing the light emitted by the cable 14. The light is emitted on numerous surfaces of the housing 12, thereby reducing the likelihood of the user missing the visual alert. Attention may then be focused on the display 28 and buttons 30 and 32 that control the functions of the selective call receiver 10, instead of focusing on the visual alert.

We claim:

1. A selective call receiver, comprising:

a housing;

receiver means, disposed within said housing, for receiving messages;

light source means for providing light; and an optical fiber having a first end substantially contiguous to said light source means and disposed substantially along at least one external surface of said housing so that light is emitted substantially along the length of said optical fiber for providing an alert that a message has been received.

2. The selective call receiver according to claim 1 further comprising reflective means positioned substantially contiguous to a second end of said optical fiber for reflecting light into said optical fiber.

3. The selective call receiver according to claim 1 wherein said light source means comprises an LED.

4. The selective call receiver according to claim 1 wherein said light source means comprises a lamp.

5. The selective call receiver according to claim 1 wherein said channel means comprises a fiber optic cable.

6. The selective call receiver according to claim 2 wherein said reflective means comprises a mirror.

7. The selective call receiver according to claim 2 wherein said reflective means comprises an active matching component.

8. The selective call receiver according to claim 2 wherein said reflective means comprises a passive matching component.

9. An electronic device, comprising:

electronic means for performing a function;

housing means for housing at least said electronic means and having at least one external surface;

illumination means for providing light;

an optical fiber disposed along at least a portion of said at least one external surface of said housing means for providing a visual alert of receiving information by diffusing light from the illumination means substantially along the length of the optical fiber.

10. The electronic device according to claim 9 wherein said light channel means comprises a fiber optic member.

11. The electronic device according to claim 9 further comprising light means contiguous to said light channel means for providing light thereto.

12. A selective call receiver, comprising:

receiver means for receiving a message;

alert means for providing an alert of the reception of the message by illuminating an optical fiber disposed substantially along at least one external surface of the selective call receiver so that light is emitted substantially along the length of said optical fiber.

13. The selective call receiver according to claim 12 wherein said light conductive channel comprises a fiber optic member.

14. A method for indicating receipt of a message, comprising the step of providing an alert indicating the receipt of the message by illuminating an optical fiber disposed substantially along at least one external surface of an electronic device so that light is emitted substantially along the length of said optical fiber.

* * * * *

UNITED STATES PATENT AND TRADEMARK OFFICE

CERTIFICATE OF CORRECTION

PATENT NO. : 5,087,906

DATED : February 11, 1992

INVENTOR(S) : Eric T. Eaton, et. al.

It is certified that error appears in the above-indentified patent and that said Letters Patent is hereby corrected as shown below:

Claims 5, 10, 11 and 13 should be deleted from above mentioned patent.

Signed and Sealed this

Fifteenth Day of June, 1993

Attest:

MICHAEL K. KIRK

Attesting Officer

*Acting Commissioner of Patents and Trademarks*